United States Patent [19]

Berke et al.

[11] 4,401,727
[45] Aug. 30, 1983

[54] FERROUS PRODUCT HAVING AN ALLOY COATING THEREON OF AL-ZN-MG-SI ALLOY, AND METHOD

[75] Inventors: Neal S. Berke, Allentown; Herbert E. Townsend, Center Valley, both of Pa.

[73] Assignee: Bethlehem Steel Corporation, Bethlehem, Pa.

[21] Appl. No.: 391,217

[22] Filed: Jun. 23, 1982

[51] Int. Cl.³ .................... B32B 15/18; B32B 15/20
[52] U.S. Cl. .................................. 428/610; 428/650; 428/653; 428/658; 428/659; 428/939; 148/127; 427/433; 427/398.1
[58] Field of Search ............... 428/610, 611, 650, 652, 428/653, 658, 659, 681, 939; 427/433, 398.1; 148/11.5 Q, 127

[56] References Cited

U.S. PATENT DOCUMENTS

| | | | |
|---|---|---|---|
| 3,782,909 | 1/1974 | Cleary et al. | 428/653 |
| 4,029,478 | 6/1977 | Lee | 428/659 |
| 4,287,009 | 9/1981 | Allegra et al. | 148/11.5 Q |
| 4,350,539 | 9/1982 | Torok et al. | 428/653 |

FOREIGN PATENT DOCUMENTS 56-156745 12/1981 Japan .................. 427/433

*Primary Examiner*—Michael L. Lewis
*Attorney, Agent, or Firm*—John I. Iverson; William B. Noll

[57] ABSTRACT

A coated ferrous article with improved properties, e.g., improved overall corrosion resistance and good appearance. The article has a ferrous substrate and a ductile, adherent, corrosion resistant alloy coating metallurgically bonded to the substrate. The alloy coating has a thin intermetallic alloy layer intermediate the substrate and an alloy overlay. The alloy overlay consists essentially of, by weight, magnesium from 3% to 20%, silicon from 3% to 15%, balance aluminum and zinc, where the $$\frac{\text{(Al weight percent)}}{\text{(Zn weight percent)}}$$

is between 1 and 1.5. The metallurgical structure of the overlay is a mixture of (1) cored aluminum-rich dendrites having dendrite arm spacings (DAS) of less than 10μ, (2) zinc-rich interdendritic regions, and (3) intermetallic phases of zinc, aluminum, magnesium and silicon. The article may be produced by hot dip coating a ferrous substrate in a molten metal bath of the above composition.

18 Claims, 13 Drawing Figures

PRIOR ART

FERROUS PRODUCT HAVING AN ALLOY COATING THEREON OF AL-ZN-MG-SI ALLOY, AND METHOD

BACKGROUND OF THE INVENTION

This invention is directed to a corrosion resistant ferrous article comprising a ferrous substrate having an alloy coating on a surface thereof, which coating consists essentially of aluminum, zinc, magnesium and silicon and to a method of producing such article.

Galvanizing is the conventional way of providing a ferrous article with a corrosion resistant coating. Although zinc alone provides substantial protection against corrosion and is acceptable for many purposes, its corrosion resistant properties can be improved by adding minor percentages of other metals to the molten bath of zinc in which the ferrous articles are dipped. Examples thereof are:

U.S. Pat. No. 3,320,040, directed to the production of a paintable, spangle-free galvanized ferrous article having a ductile, adherent coating comprising 0.1–3.5% dissolved Al to regulate the thickness of the intermetallic layer between the coating and the ferrous substrate, 0.02–0.2% Mg to improve adherence of paint to the coating, less than 0.1% Pb to provide a substantially spangle-free surface, and the balance Zn;

U.S. Pat. No. 3,993,482, directed to a zinc base alloy coating for a ferrous substrate. The coating contains up to about 2% aluminum plus larger amounts of magnesium and a trace of chromium, with an optimum coating alloy comprising 5% Mg, 2% Al, and balance Zn, except for 0.2% Cr to increase corrosion resistance;

U.S. Pat. No. 3,505,042, directed to a hot-dip coating method, wherein a ferrous metal article is coated with a zinc alloy containing 1.5–5% by weight magnesium, plus 0.15–0.5% aluminum to retard iron-zinc alloy growth in the intermetallic layer and reduce surface oxidation losses in the bath;

British Pat. No. 1,125,965, cited in the specification of U.S. Pat. No. 3,993,482, is briefly reviewed by the U.S. patentee as teaching a zinc-based alloy for use against widespread corrosion. The alloy contains 1–4% Mg and 0.05 to 5% Al, with best results being obtained with about 2.5% Mg and about 4.4% Al.

In situations where high resistance to an $SO_2$ environment is desired, ferrous articles are coated with aluminum containing lesser amounts of other metals. Examples of such coatings are described in:

U.S. Pat. No. 2,406,245, directed to a process for hot-dip coating ferrous articles in a molten Al bath containing 7.5–9.5% Si to improve adhesion and 0.02–2.5% Mg, to improve luster and spangle;

U.S. Pat. No. 3,010,190, directed to an aluminum alloy coating for a ferrous metal base, which coating contains up to 6% Si to decrease the intermetallic layer and 0.5–2% Zn to eliminate the surface roughening effect and steel grey appearance imparted to the coating by the Si; and U.S. Pat. No. 3,026,606, directed to hot-dip aluminum coating of ferrous articles in an aluminum bath containing Mg and Si in a stoichiometrical relationship to yield up to 25% $Mg_2Si$ in the coating.

Whereas zinc coatings on steel offer galvanic protection to unprotected edges of the steel base in salt water, such coatings have relatively poor resistance to $SO_2$ environments. Aluminum coatings on steel are noted for their durability, but fail to provide galvanic protection to unprotected edges of the steel base. Therefore, combinations of the two metals, zinc and aluminum, have been employed to produce coatings having the desirable features of both types of coatings. Examples of aluminum-zinc coatings are described in:

U.S. Pat. No. 3,505,043, directed to a metallic coated ferrous product having a eutectic type aluminum-zinc coating containing, by weight, 3–17% aluminum, 1–5% magnesium, balance zinc; and German Patent Application No. 2,146,376 which discloses that if steel is first coated with pure zinc, it can then be coated with a zinc alloy which contains up to 50% Al, preferably no more than 35% Al. A specific example of the coating is one having 20% Al, 5% Mg, 1% Si, balance Zn;

U.S. Pat. Nos. 3,343,930 and 3,393,089, directed, respectively, to the product and to the method of hot-dip coating a ferrous base with an alloy comprising, by weight, 25 to 70% aluminum, and the balance essentially zinc. A small amount, e.g., about 1.6% of silicon is included to insure adherence of the coating to the substrate. A typical commercial sheet product, which the inventors of this invention believe represent the optimum in corrosion resistance performance for commercial hot-dip coated products, consists of a steel base having a coating comprised of an alloy overlay and a thin intermetallic layer intermediate said overlay and steel base, and a composition of, by weight, 55% aluminum, 1.6% silicon, balance essentially Zn (hereinafter referred to as 55Al-Zn). The as-cast microstructure of the overlay has cored aluminum-rich dendrites and zinc-rich interdendritic constituents.

In U.S. Pat. No. 3,505,043, up to 17% Al is added to the Zn coating along with 1.5% to 4% Mg. In German Patent Application No. 2,146,376, a typical alloy coating contains 20% Al, 5% Mg, 1% Si, balance Zn. With each such zinc-base alloy coating the corrosion resistance performance would be from 1½ to 3 times worse than 55Al-Zn, particularly in the coating's resistance to $SO_2$ environments.

Surprisingly, it was discovered with the present invention that with an aluminum/zinc alloy coating containing sufficient amounts of both Si and Mg, a product results which has even better overall corrosion resistant properties and good appearance compared to the 55Al-Zn product. Such discovery will become apparent from the description which follows.

SUMMARY OF THE INVENTION

This invention relates to a corrosion resistant ferrous article comprising a ferrous base having a ductile, adherent, aluminum-zinc-magnesiumsilicon coating metallurgically bonded to a surface of the base, which renders the base corrosion resistant to both $SO_2$ and salt water atmospheres. The coating comprises an alloy overlay and an intermetallic alloy layer intermediate said base and said alloy overlay. The alloy overlay consists essentially of a mixture of cored aluminum-rich dendrites having dendrite arm spacings (DAS) of less than 10μ, zinc-rich interdendritic regions, and intermetallic phases of zinc, aluminum, magnesium and silicon, where two of the dominant phases comprise $Mg_2Si$ and $MgZn_2$.

This invention also relates to a method for producing a metallic coating metallurgically bonded to a ferrous base, comprising the steps of (1) cleaning said ferrous base; (2) coating said cleaned ferrous base with a molten alloy comprising Zn, Al, Si and Mg; and (3) cooling said coating on said ferrous base. The resulting product consists essentially of an alloy overlay on a thin layer of an intermetallic alloy layer adjacent the ferrous base. The alloy overlay consists essentially of a combination of aluminum and zinc with effective amounts of magnesium and silicon to enhance the performance of the coating in rendering the ferrous base corrosion resistant to both $SO_2$ and salt water atmospheres, wherein said effective amounts, by weight, are magnesium between 3% and 20%, silicon between 3% and 15%, when $$\frac{\text{(Al weight percent)}}{\text{(Zn weight percent)}}$$

is between 1 and 1.5.

DETAILED DESCRIPTION

The products of this invention comprise a ferrous base or substrate, such as a plain-carbon steel sheet or strip, having a ductile, adherent, corrosion resistant alloy coating metallurgically bonded to the base.

More specifically, the ferrous base is coated with an alloy from the quaternary Al-Zn-Mg-Si system.

Like the coatings of U.S. Pat. Nos. 3,343,930 and 3,393,089, the coatings of this invention contain cored aluminum-rich dendrites and zinc-rich interdendritic regions. Unlike the former, the coatings of this invention also contain phases discrete from the aluminum-rich dendrites and the zinc-rich interdendritic regions, which phases consist essentially of intermetallic phases of zinc, aluminum, magnesium and silicon. It is believed that the improved corrosion resistance imparted by the coating of this invention is due in part to the presence of these intermetallic phases which provide obstacles or barriers for the corrosion which occurs in the zinc-rich interdendritic regions. These obstacles created by these phases increase the time required for corrosion to reach the ferrous substrate and thereby improves the corrosion resistance of the coating.

In broad and preferred embodiments, from a corrosion resistance point of view, the alloy overlay consists essentially of, by weight:

|  | Broad | Preferred |
|---|---|---|
| Silicon | 3%–15% | 5%–15% |
| Magnesium | 3%–20% | 5%–15% |
| Aluminum—Zinc | Balance | Balance |
| Ratio $\frac{\text{(Al weight percent)}}{\text{(Zn weight percent)}}$ | 1 to 1.5 | 1.2 to 1.3 |

While other elements may be present in the alloy in trace amounts, it is important to avoid the noble or heavy metals, particularly Pb and Cu. However, Fe may be present in an amount up to 1%.

The starting substrate can be any ferrous material whose surface is susceptible to corrosion, e.g., iron and low carbon steels. It can have any desired shape, e.g. sheets, rods, conduits, wires and articles of convoluted and complex shapes. As is well known in the art, the surface of the starting substrate should be substantially free of organic and inorganic impurities, e.g,, oil, grease and metal oxides, to ensure uniform adherence of molten alloy thereto.

Products of this invention in the form of test panels can be prepared by a laboratory dipping technique, in which panels cut from a low carbon steel strip, whose surfaces have been suitably cleaned, e.g., free of grease and oxides, and protected against oxidation, are dipped in a molten bath of the selected alloy having a composition which falls within the broad or preferred range of the alloy coating, withdrawn and drained. Such a technique is described hereinafter.

The products of this invention can be prepared on a commercial scale employing a conventional continuous hot-dip coating line, as known in the art. Two known types of continuous hot-dip coating lines are the Sendzimir line and the Selas-type direct fired furnace line. Each type of line involves gas cleaning of the ferrous base, typically a plain carbon steel strip, to prepare the strip surface for the reception of the molten alloy coating metal. In the Selas practice, for example, the steel strip is heated in a direct fired furnace to a temperature of about 1275° F. (690° C.) followed by treatment in a second furnace, the atmosphere of which is maintained under reducing conditions. In such second furnace the surfaces of the steel strip are protected against oxidation in a protective atmosphere of hydrogen-nitrogen, which by way of example may be 18% $H_2$, by volume, balance nitrogen. After the steel strip leaves the second furnace, without being exposed to the atmosphere, the strip is immersed in a molten alloy bath composed of the elements as defined above within the quaternary Al-Zn-Mg-Si system. The temperature of the strip as it enters the bath is below the temperature of the bath, which in the case of the coating baths according to this invention are between about 1000° to 1300° F. (539° to 705° C.). The actual temperature of the molten alloy bath for a commercial hot-dip coating line is maintained at about 50° F. (22° C.) above the melting point for the alloy composition of the bath. Upon emerging from the bath, the alloy coating on the strip is passed between coating wiping dies to control the thickness of the coating, after which the coating solidifies in air or by accelerated cooling means. The resulting product is a corrosion resistant alloy coating metallurgically bonded to said steel strip.

A laboratory method to simulate the actual time and processing parameters for such a commercial continuous hot-dip coating line has been devised. Such method, by way of example for a coating bath having a nominal composition, by weight percent, of 45Al-35Zn-10Si-10Mg, and a melting point of 1075° F., includes the following steps:

(a) providing a cold-rolled, plain carbon (DQSK strand cast) steel sheet, the dimensions of which are 0.025"×4.5"×10";

(b) cleaning the surface of said sheet with an aqueous solution;

(c) preheating the cleaned sheet to a temperature of about 1200° F. in a reducing atmosphere of 30% $H_2-N_2$;

(d) maintaining said sheet in said reducing atmosphere while lowering the temperature of the steel sheet to about 950° F., i.e. below the temperature of the molten coating bath;

(e) immersing said sheet in said molten coating bath, maintained at a temperature of about 155° F. above the melting point (1075° F.);

(f) withdrawing said sheet, after an elapsed time of about 4 seconds, and cooling the molten coating adhering to the sheets at a rate of about 40° F./sec. during the entire solidification of the coating by directing blowers against the coated sheet.

This laboratory method results in a coating thickness of approximately 1.4 mils. Due to improved coating flow characteristics for a commercially hot-dip coated product, resulting in part from the use of coating wiping dies directed against the molten coating adhering to the steel base product following withdrawal of the coated product from the molten coating bath, a typical commercial coating thickness will be between 0.8 and 1.0 mils. Additionally, the bath temperature may be reduced from about 1230° F. to a range between 1135° to 1150° F.

ANALYSIS OF PRODUCT VARIABLES

To develop a better understanding of coating alloys from within the quaternary Al-Zn-Si-Mg system, and to determine the interrelationship of the several elements when applied as a coating to a ferrous base, an intensive investigation was conducted on coated products having a coating composed of elements from the above alloy system.

Two goals of this investigation were to identify the range of coating compositions, within such alloy system that would (1) provide a high level of corrosion resistance to an underlying steel base, and (2) be acceptable as a coating from an appearance standpoint. The criterion for corrosion resistance performance was to identify those alloy coatings, which when applied to a ferrous substrate, would perform as well or better, preferably twice as well, as 55Al-Zn.

With respect to appearance, a visual evaluation, the appearance criteria include such features as color, texture and reflectivity. A low rating, on a scale of 0 to 10, for example, would be given to a coating which was discolored and/or rough due to the presence of scum. A high rating was given to a coating which was smooth and shiny, and was characterized by a satin sheen finish having a fine spangle.

With such goals defined, a number of samples were prepared using coating alloys from within the above quarternary alloy system. A statistical analysis of the corrosion and appearance data was employed to identify the most promising coating compositions in the quaternary Al-Zn-Mg-Si system. The data generated by this investigation enabled the inventors to calculate the effect of certain of the four elements on the performance of coating compositions within such alloy system.

One important discovery from this investigation, which discovery is confirmed by the several Figures hereinafter described in detail, was that within the alloy ranges for the coatings on products of this invention there is a preferred Al/Zn ratio between 1.2 and 1.3. While such ratio is preferred, good results are achievable within the broader range of 1.0 to 1.5 for the Al/Zn.

Turning now to the accompanying FIGURES, particularly FIGS. 1-9, the plots thereof depicting performance values were produced by regression analysis from the data of a large number of test samples. FIGS. 1-6 represent the calculated hours per mil of coating to the designated degree of rusting or weight loss, at the selected silicon level, for different aluminum, zinc, and magnesium concentrations.

However, while only several contour lines have been illustrated for purposes of simplifying the drawings, it should be understood that many such lines could have been included. To illustrate this feature without unduly complicating the drawings, an arrow is shown within an area to indicate that further improvements will be observed in the coating with compositional changes in the direction of the arrow.

Figure 1:
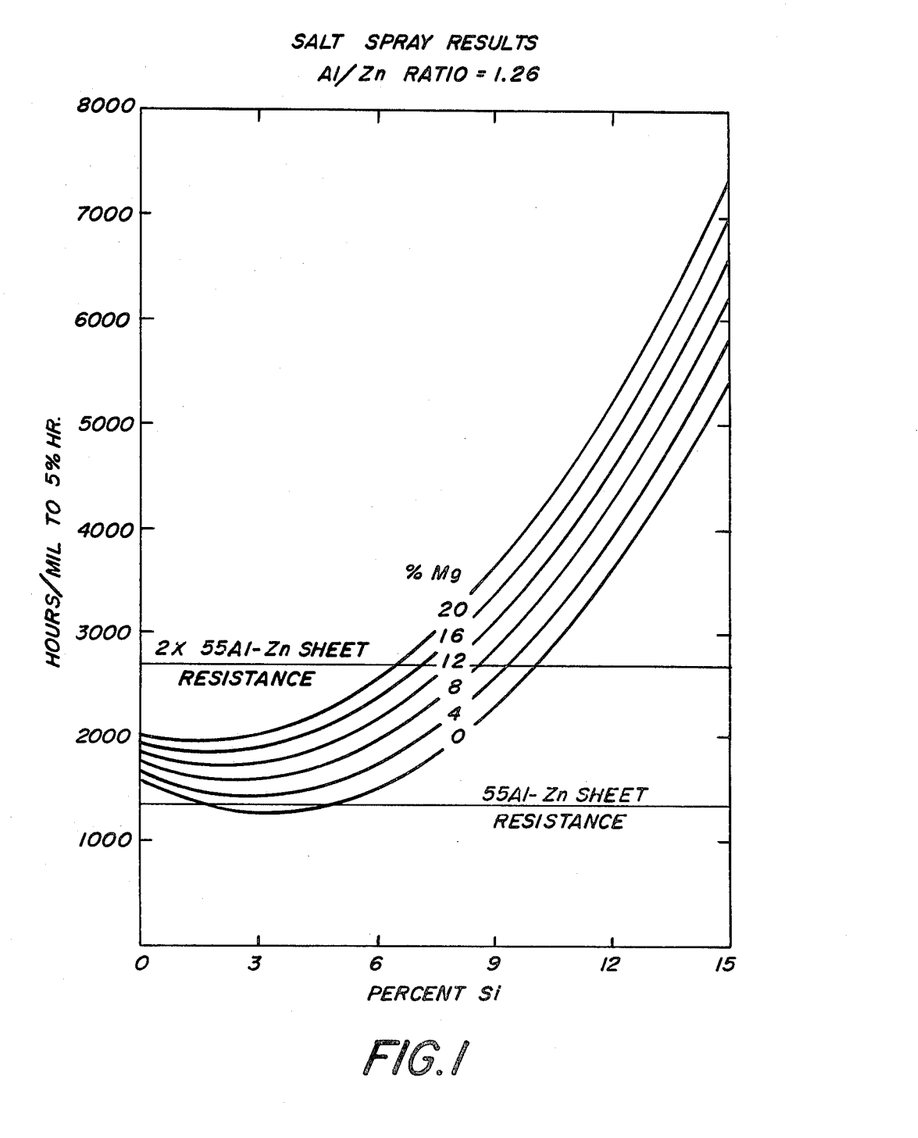
FIG. 1 is a plot of the number of hours to the appearance of red rust of ferrous sheet coated with various combinations of elements within the quaternary Al-Zn-Si-Mg system, illustrating the effects of Mg and Si with a fixed Al/Zn ratio of 1.26, in a salt spray environment.

FIG. 1 shows the salt spray resistance of various alloy coated products as a function of silicon and magnesium, for coatings at Al/Zn=1.26. There is a nonlinear effect of silicon on salt spray resistance with a minimum performance at between about 3% to 3.5%. Though magnesium additions improve the salt spray resistance, the best results occur when %Si>3.5%. By inspection of FIG. 1, it will be seen that the condition for improving salt spray resistance by a factor of two over 55 Al-Zn sheet is:

$$Si+(Mg/5) \geq 10\%$$

Figure 2:
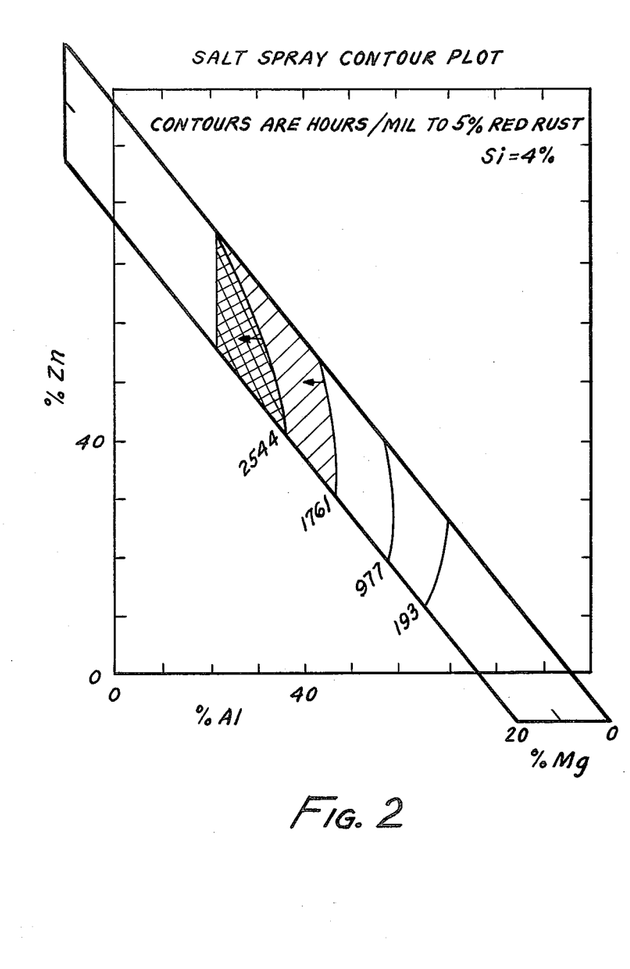
FIG. 2 is a contour plot showing the salt spray resistance for steel products coated with alloys within the Al-Zn-Si-Mg system at 4% Si.
Figure 3:
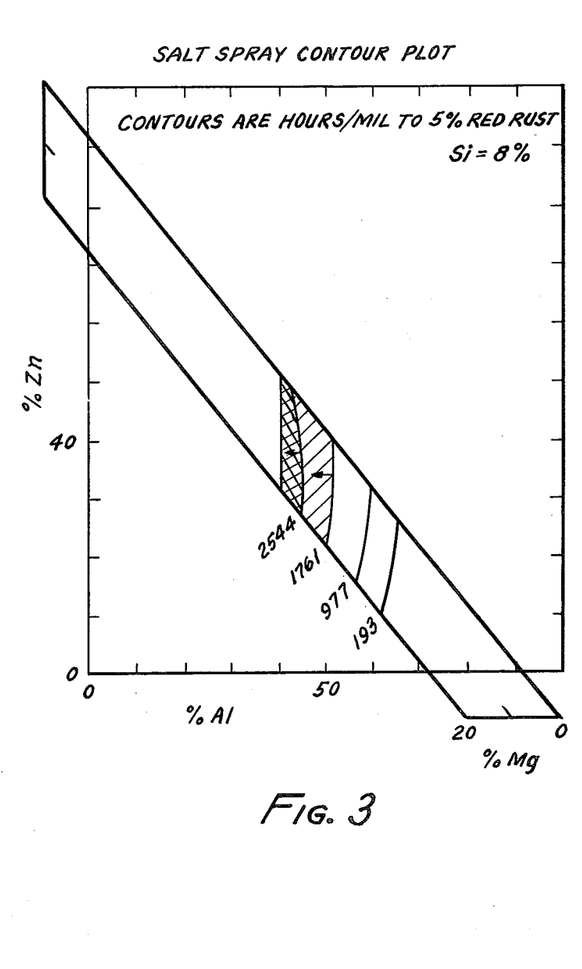
FIG. 3 is contour plot similar to FIG. 2 except that the coatings contain 8% Si.

FIGS. 2 and 3 are contour plots showing the salt spray resistance for coatings within the Al-Zn-Mg-Si system for 4% and 8% silicon, respectively. Optimum performance is shown by the shaded areas.

Figure 4:
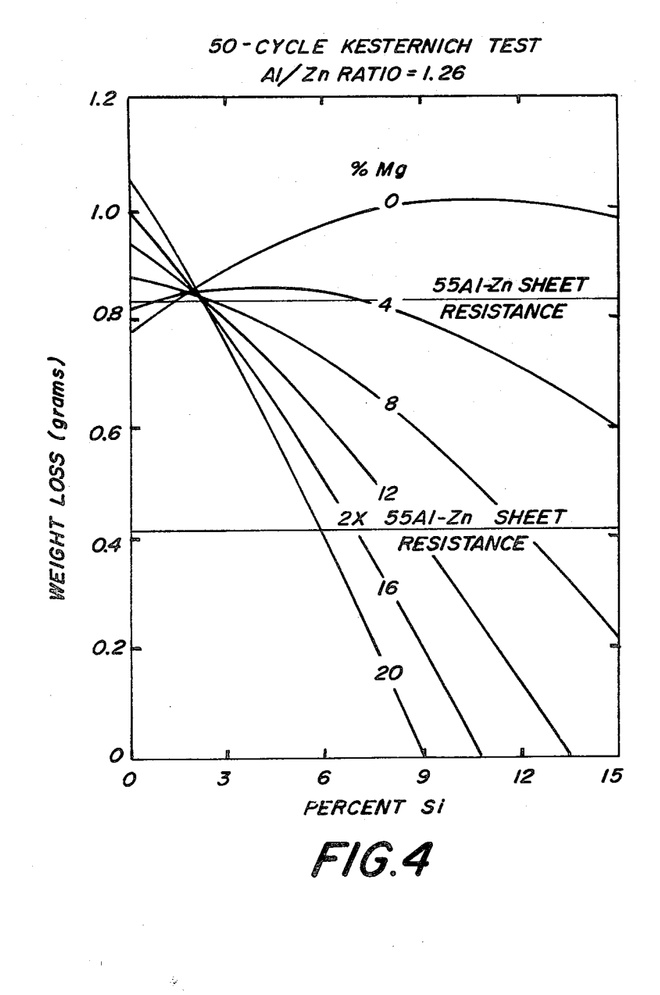
FIG. 4 is a plot of weight loss in an $SO_2$-containing environment of ferrous sheet coated by various combinations of elements within the quaternary Al-Zn-Si-Mg system, showing the effects of variations of Mg and Si with a fixed Al/Zn ratio of 1.26.

FIG. 4 shows the $SO_2$ resistance of coatings with Al/Zn=1.26. Again, nonlinear effect of silicon appear and the positive interaction between silicon and magnesium is readily seen. For two times the resistance to SO$_2$, or one-half the weight loss, than 55Al-Zn sheet, it is important to satisfy the following general conditions:

Si≧5%, Mg≧4%, and (Si weight percent)$^{0.6}$+(Mg weight percent)$^{0.6}$≧8.

Figure 5:
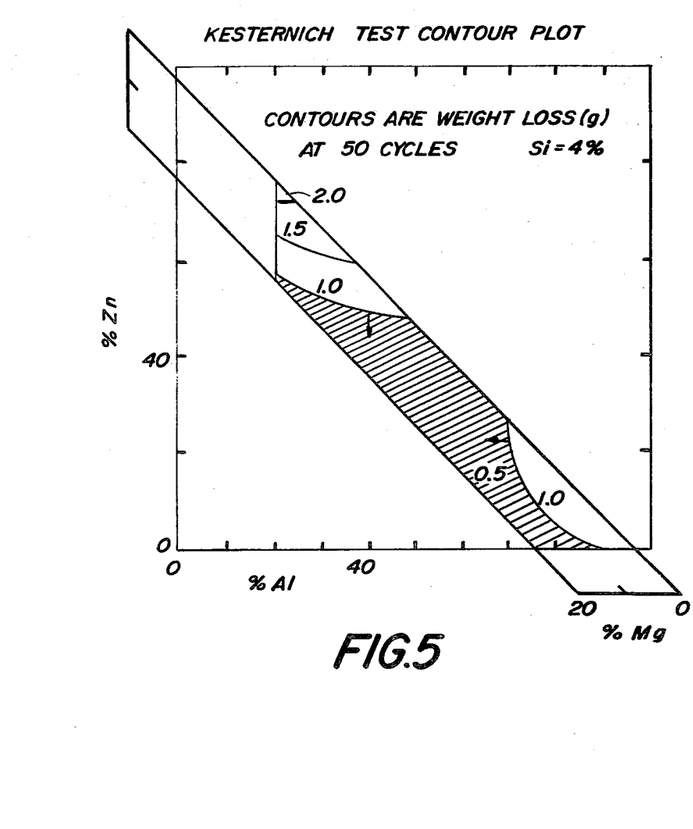
FIG. 5 is a contour plot showing weight loss in an $SO_2$-containing atmosphere for steel products coated with alloys within the Al-Zn-Si-Mg system at 4% Si.
Figure 6:
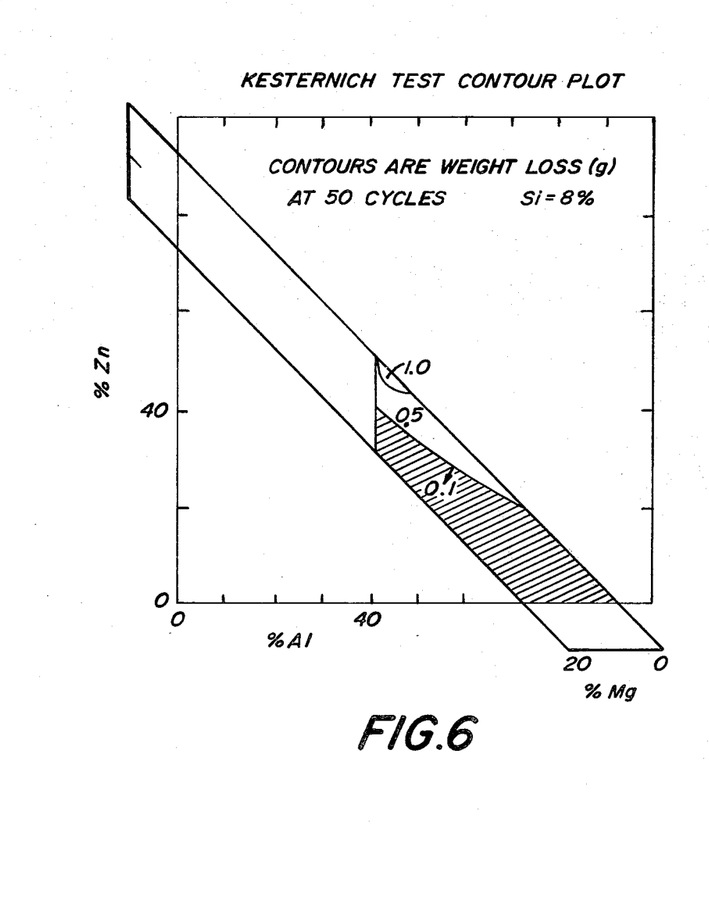
FIG. 6 is a contour plot similar to FIG. 5 except that the coatings contain 8% Si.

FIGS. 5 and 6 are contour plots for the weight loss in SO$_2$ environments of coating compositions within the Al-Zn-Si-Mg system. Since the contours represent weight loss after 50 cycles, the lower the value the better the coating performance. As in the case of the salt-spray projections (FIGS. 2 and 3) aluminum, zinc, and magnesium contents were varied at two silicon levels of 4% and 8%, FIGS. 5 and 6 respectively. Optimum performance is shown by the shaded areas.

Figure 7:
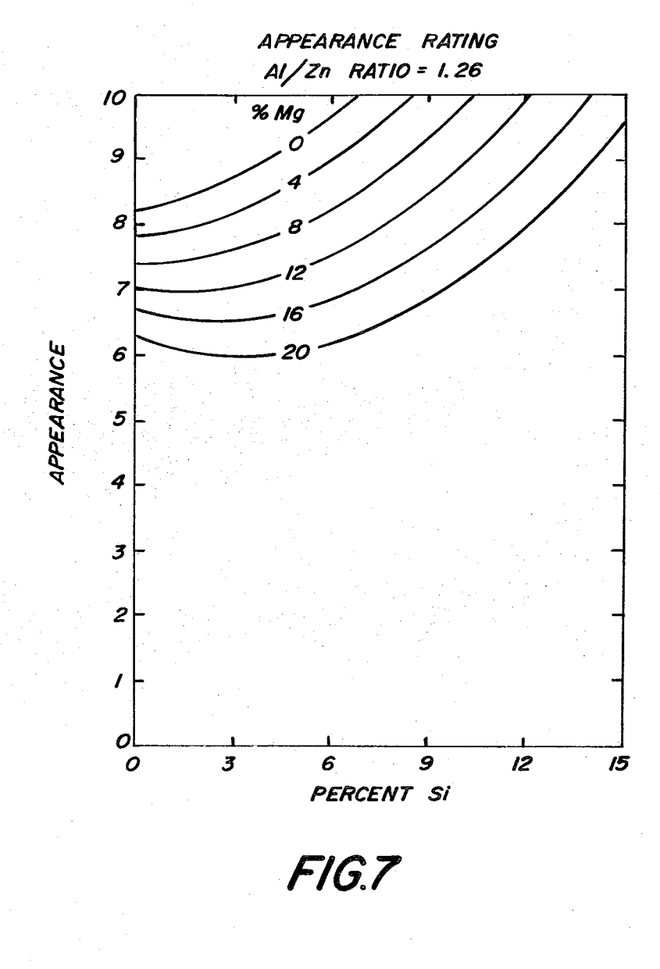
FIG. 7 is a plot of coating appearance of ferrous sheet coated by various combinations of elements within the quaternary Al-Zn-Si-Mg system, showing the effects of variations of Mg and Si with a fixed Al/Zn ratio of 1.26.

FIG. 7 shows the appearance of as-cast coatings with Al/Zn=1.26. It was observed that silicon counters the adverse effects on apperance caused by magnesium additions, hence, for a coating with equivalent or better appearance than coatings of 55Al-Zn sheets the following condition should be satisfied:

Si≧1.5+0.6 Mg.

Figure 8:
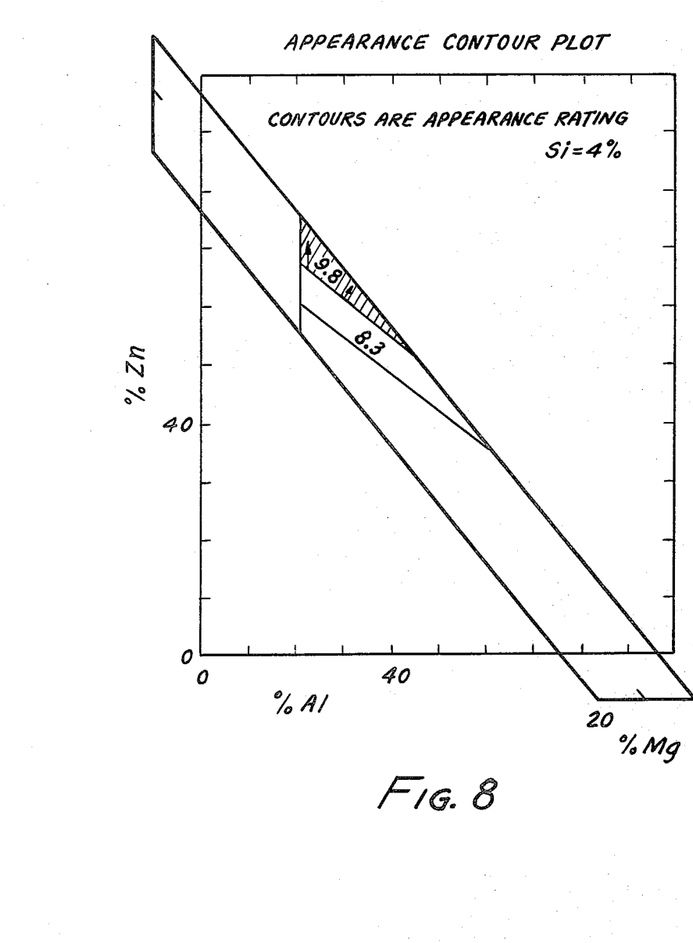
FIG. 8 is a contour plot showing the coating appearance for steel products coated with alloys within the Al-Zn-Si-Mg system at 4% Si.
Figure 9:
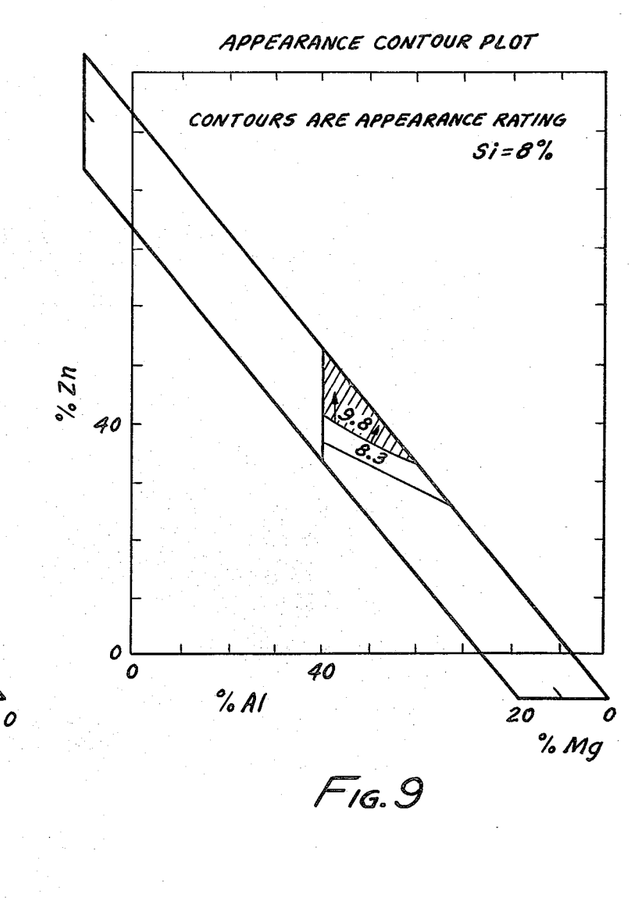
FIG. 9 is a contour plot similar to FIG. 8 except that the coatings contain 8% Si.

Coutour plots of appearance ratings of Al-Zn-Mg-Si, at 4% and 8% silicon, are shown in FIGS. 8 and 9. The higher numbers represent the coatings with the preferred appearance. For purposes of clarification, "9" represents a very good coating from an appearance standpoint. On this same scale, a "10" would be equivalent to the best appearing commercial hot-dipped coatings. The optimum appearance for the coatings are shown by the shaded areas.

If, for example, FIGS. 2, 5 and 8 or FIGS. 3, 6 and 9, were superimposed on each other, to select a composition which optimized the coating's performance in all three tests, namely, (1) salt spray test, (2) Kesternich test, and (3) appearance, it would be found that the optimum ratio of Al/Zn is between 1.2 and 1.3, and magnesium and silicon are each present in an amount of about 10%. However, for a commercial product it should be noted that situations may arise where it may be desirable to enhance the coating performance in one test while settling for less than optimum performance in another.

There are further considerations which are not apparent from the above FIGURES, but must be considered for a commercial hot-dip coating operation. Such considerations involve the properties of the coating bath. For example, at 20% Mg combustion in air will occur. Thus, in order to avoid the costly expenditure of a means to protect the coating bath, e.g. enclosing the bath in a nitrogen atmosphere, magnesium in the molten alloy bath should not exceed 20%. Further, when magnesium is present in an amount of 6% or more, for optimum bath fluidity it is desirable to have silicon present in the bath at a level of at least 5%, preferably at least 7%.

Based on the information gathered from FIGS. 1 to 9, the broad and preferred compositional ranges for the alloy coating constituents set forth hereinbefore were established. The numerical values for compositional ranges or specific constituents, as used herein, are by weight percent.

SPECIFIC EMBODIMENT-PRODUCT

Coated panels according to the prior art having the optimum corrosion resistance values currently available in a commercial hot-dip metallic coated product, and panels of this invention were prepared in the laboratory by dipping low-carbon steel panels, three panels each, in various molten metal baths having the compositions, by weight percent, listed in TABLE I.

TABLE I

| | Test Panels (3 each) | | | |
|---|---|---|---|---|
| | Al | Mg | Si | Zn |
| 1 (U.S. 3,343,930) | 53 | — | 2.2 | Balance |
| 2 (U.S. 3,343,930) | 53 | — | 2.2 | Balance |
| 3 (this invention) | 43 | 18 | 6 | Balance* |
| 4 (this invention) | 44.1 | 7.4 | 8 | Balance* |

*including trace amounts of oxides, principally as SiO$_2$.

The panels were removed from the molten metal bath and the excess coating metal adhering thereto drained leaving an adherent, corrosion resistant coating metallurgically bonded to the steel base. Metallurgical bond, as known in the art (*Metallurgical Principles for Engineers* by J. G. Tweeddale, p. 273, published by London ILIFFE Books Ltd. 1962) and used herein, refers to the type of joint in which two dissimilar metals are brought into contact and so treated that an intermediate alloy is formed between them which gives a direct metallurgical link between the two dissimilar metals.

To determine the corrosion resistance performance of such coated panels, the panels were subjected to two accelerated laboratory tests, namely, (1) salt spray test, (unprotected edges), designated as ASTM Standard B-117-73, and (2) Kesternich test, (unprotected edges), designated as DIN 50018. The test results for the alloy coated panels are listed in TABLES II and III. There were differences in coating thicknesses which affected the corrosion resistance performance of the coated test panels, i.e., test panels 1 and 3 had thicker coatings than test panels 2 and 4. Even though corrosion resistance was adjusted to a "per mil of coating thickness," the results for panels 1 and 3 cannot be directly compared to those for panels 2 and 4 since corrosion performance is not always a linear function of coating thickness. That is, a 0.5 mil coating is not necessarily one-half as good as a 1.0 mil coating. Nevertheless, because the method of preparation of the test panels with the thicker coating, or thinner coating as the case may be, was duplicated, a valid comparison can be made between test panels 1 and 3 and test panels 2 and 4.

TABLE II (Prior ART)

Corrosion Resistance (unprotected edges)*

| Test | Alloy Coating** | Salt Spray (h/mil to 5% R.R.) | Kesternich Test (50 cycles) (Wt. Loss/% Red Rust) |
|---|---|---|---|
| 1 | 53Al/2.2Si/bal. essentially Zn | 1530 | 1.4 gm |
| 2 | 53Al/2.2Si/ bal. essentially Zn | 1178 | 90%*** |

TABLE III (This Invention)

Corrosion Resistance (unprotected edges)*

| Test | Alloy Coating** | Salt Spray (h/mil to 5% R.R.) | Kesternich Test (50 cycles) (Wt. Loss/% Red Rust) |
|---|---|---|---|
| 3 | 43Al/6Si/18Mg/ | 2563 | 0.53 gm |

TABLE III-continued

<table>
<tr><td colspan="4">(This Invention)</td></tr>
<tr><td colspan="4">Corrosion Resistance<br>(unprotected edges)*</td></tr>
<tr><td>Test</td><td>Alloy Coating**</td><td>Salt Spray<br>(h/mil to 5% R.R.)</td><td>Kesternich Test<br>(50 cycles)<br>(Wt. Loss/%<br>Red Rust)</td></tr>
<tr><td>4</td><td>bal. essentially Zn<br>44.1Al/8Si/7.4Mg/<br>bal. essentially<br>zinc</td><td>4459</td><td>10%***</td></tr>
</table>

*average of three (3) tests
**coating chemistries are approximations due to apparent alloy oxidation, and the presence of a fractional amount of Fe picked up through diffusion with the steel base of the coated panel
***due to base steel rusting with thinner coatings, weight loss could not be measured at 50 cycles The test data of TABLES II and III illustrate the superior performance of the coated panels (3, 4) according to this invention over comparably produced coated panels (1, 2) according to the prior art, i.e. U.S. Pat. No. 3,343,930, believed to have the best overall corrosion resistance in a commercial hot-dip metallic coated product. The superiority is on the order of two to three times better.

PRODUCT EVALUATION

Having established the superior corrosion resistance performance (TABLE III) of alloy coated products, whose coating falls within the broad and preferred ranges described above, an examination of the coating microstructure and corrosion mechanism may be helpful to explain such superiority.

For this examination, as-cast alloy coated panels, having nominal coating compositions comparable to alloy coatings 1 and 4 in TABLE I, were prepared for analysis under the microscope. All coated panels that were tested during the investigation were processed by a rapid-cooling practice described in U.S. Pat. No. 3,782,909. That is, all alloy coatings were forced air-cooled at a rate of at least 20° F./sec., more specifically at a rate of about 40° F./sec., during the entire solidification of the coating. It is believed that this brief comment on the processing of the alloy coated panels may be helpful in understanding the microstructure and corrosion mechanism of 55Al-Zn sheet, as well as the microstructure and corrosion mechanism of the alloy coatings of this invention.

Figure 10:
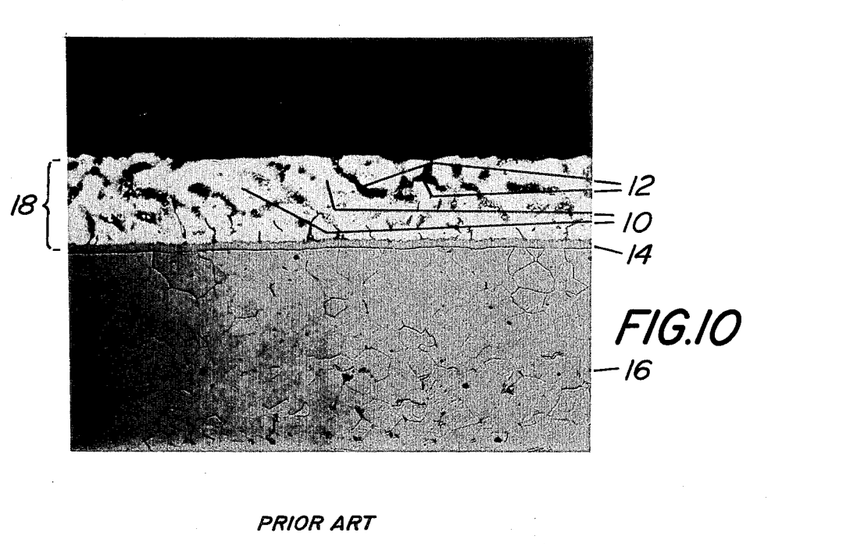
FIG. 10 is a photomicrograph of an etched cross-section, magnified to 500×, of an as-cast coating microstructure for a coating alloy system produced according to the prior art.

FIG. 10 is an etched cross-section, magnified to 500×, of the coated panel, having a coating composition comparable to #1 of TABLE I. Under the rapid-cooling processing conditions of U.S. Pat. No. 3,782,909, the coating on 55Al-Zn sheet develops a nonequilibrium and complex structure. The first solid formed during the coating solidification is alpha-aluminum 10 at about 80% Al leading to a cored dendritic structure in which the final liquid to solidify is substantially lower in aluminum content (zinc-rich) 12 and whose microstructure is quite fine and not well defined. A further feature of the 55Al-Zn sheet coating is a thin intermetallic layer 14 between the steel base 16 and coating overlay 18. Thus, the coating microstructure of 55Al-Zn sheet may be described as comprising cored aluminum-rich dendrites 10 and zinc-rich interdendritic constituents 12 overlying a thin intermetallic layer 14.

The mode of corrosion of 55Al-Zn may be described as one of preferential corrosion, that is, the zinc-rich interdendritic portion 12 of the coating corrodes preferentially. Further, the intermetallic layer 14 is believed to be cathodic to the steel substrate as well as to the other components of the coating. Accordingly, this layer 14 appears to function as an electrochemical barrier that prevents corrosion of the steel substrate subsequent to interdendritic corrosion of the overlay 18. Thus, the excellent corrosion resistance performance of 55Al-Zn sheet, particularly over the conventional coatings, such as aluminized or galvanized sheet, may be attributed to the interrelationship of (1) the coating overlay comprising the cored aluminum-rich dendrites and zinc-rich interdendritic constituents, and (2) the intermetallic layer.

Despite the excellent performance of 55Al-Zn sheet, the present invention describes a method for producing an alloy coating for steel which is capable of surpassing the performance of 55Al-Zn sheet coatings by as much as two-fold.

Figure 11:
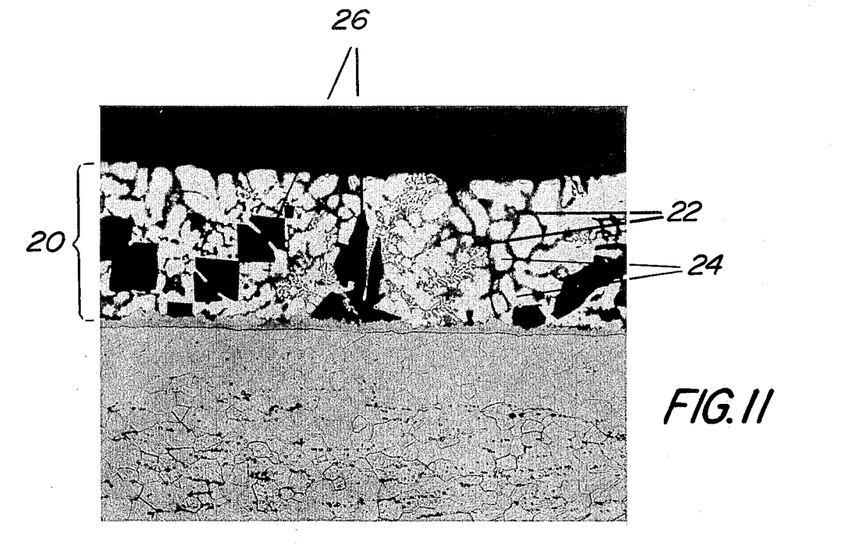
FIG. 11 is a photomicrograph of an etched cross-section, magnified to 500×, of the as-cast coated product according to this invention.

FIG. 11 is a photomicrograph, similar to FIG. 10, showing an as-cast coated product having a coating comparable to #4 of TABLE I, and produced according to this invention. The coating overlay microstructure illustrated in FIG. 11 is similar, yet more complex than the microstructure of 55Al-Zn sheet overlay illustrated in FIG. 10. For example, the coating overlay 20 consists of a mixture of cored aluminum-rich dendrites 22 containing zinc-rich interdendritic constituents 24, and intermetallic compounds 26 of zinc, aluminum, magnesium and silicon. While a number of intermetallic compounds have been identified, two of the prominent compounds are $MgZn_2$ and $Mg_2Si$. Additionally, $SiO_2$ has been identified in the coating as crystals embedded in $Mg_2Si$. Further, where Mg is present in the coating in an amount of at least about 10%, as found in #3, the phase identified as $Mg_{32}(Al,Zn)_{49}$ will be found.

Figure 12:
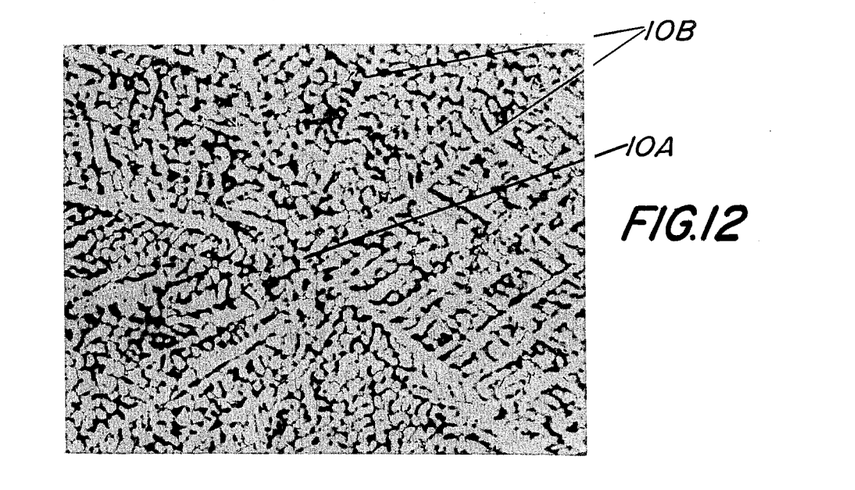
FIG. 12 is a photomicrograph of the etched surface, magnified to 200×, of an as-cast coating microstructure for a coating alloy system produced according to the prior art.
Figure 13:
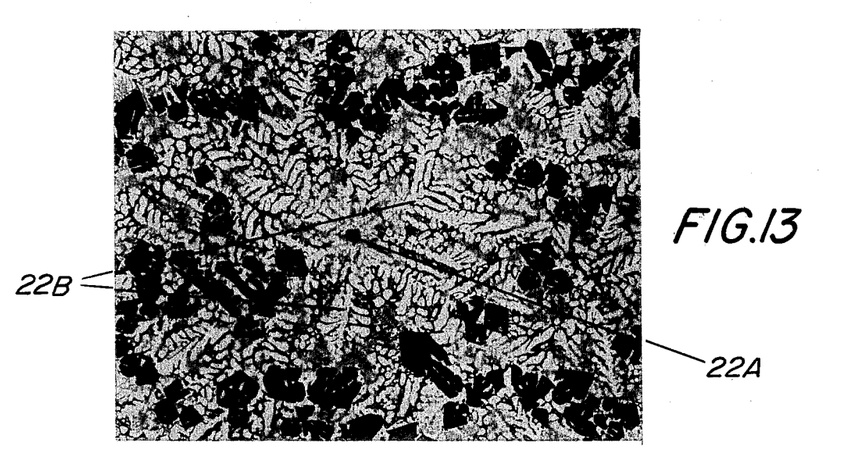
FIG. 13 is a photomicrograph of the etched surface, magnified to 200×, of the as-cast, coated product according to this invention.

The improved performance of alloy coatings within the scope of this invention has been attributed to several possible factors. FIGS. 12 and 13 are photomicrographs, magnified to 200×, of a selected area on the etched surface of 55Al-Zn sheet and the coating of this invention, respectively, showing an aluminum-rich dendrite.

The dendrites featured in such Figures are characterized by a core 10A, 22A (FIGS. 12 and 13, respectively) and a plurality of branches or arms 10B, 22B emanating therefrom as angles normal to said core. At high magnification these branches or arms are readily observable and the perpendicular distances between such branches or arms can be measured. These measured distances are called the dendrite arm spacings (DAS). For a more detailed discussion of dendrite formation, as well as dendrite arm spacing, reference is made to *Solidification Processing* by Merton C. Flemings, pp. 146-148, published by McGraw-Hill Inc. 1974. In any case, for comparably produced coatings, the DAS for the coatings of this invention are at least $3\mu$ smaller than the DAS for 55Al-Zn sheet. For reference, the DAS for the coatings of this invention produced by the rapid cooling technique described above, will fall within the range of less than $10\mu$, preferably between about 3 to $9\mu$. In contrast to this, a commercially produced 55Al-Zn sheet will have a DAS in the range of 10 to $13\mu$.

It is the opinion of the inventors that the atmospheric corrosion mechanism for the alloy coatings of this invention is similar to that established for 55Al-Zn sheet coatings. That is, such mechanism is that of preferential corrosion of one phase or microstructural constituent.

The first factor resulting in the improved performance of the coated products of this invention is the smaller DAS found in the overlay structure over that of the overlay structure of a comparably produced 55Al-Zn sheet. With the smaller DAS the preferential corrosion of the interdendritic phase or constituent must follow a more circuitous route to reach the intermetallic layer. Secondly, if this route of preferential corrosion can be delayed by added barriers, the rate of corrosion must necessarily decrease and the coating performance increase. While the particular mode of corrosion has not been determined for the coatings of this invention, it is theorized that silicon and magnesium, when combined with aluminum and zinc, act in some unexpected manner to improve the corrosion resistance of the coatings of this invention. Without desiring to be bound to a given theory, it is believed that the following represents an approach by which the combination of silicon and magnesium act to improve such corrosion resistance.

Silicon added in small quantities, up to about 3% by weight, to Al-Zn hot-dip coatings appears in patches at the interface of the intermetallic alloy layer and the coating overlay. Silicon also occurs in the form of particles in the overlay, which particles act as cathodes in an Al-Zn matrix and thus increase the corrosion rate. The inventors believe this apparent cathodic activity accounts for the detrimental effect of small silicon additions. As silicon concentration is increased above about 3%, by weight, Al-Zn coating, the patches at the intermetallic alloy layer-coating overlay interface link-up and form a continuous silicon-rich barrier layer. It is theorized that in Al-Zn coatings this silicon barrier would increase the corrosion resistance by adding an extra corrosion-resistant layer between the environment and the steel substrate, thus accounting for the beneficial effects of higher silicon concentrations. Further, the inventors believe that magnesium additions enhance these beneficial effects by combining with silicon in the coating overlay to form $Mg_2Si$, which is not cathodic to the Al-Zn matrix. Thus, in magnesium-free Al-Zn alloy coatings most of the silicon in the coating overlay is free silicon which may be detrimental to the corrosion performance of the product. However, in the alloy coatings of this invention, most silicon in the coating overlay is combined as $Mg_2Si$ (and to a lesser extent as $SiO_2$), which contributes to the corrosion resistance of the coated product.

We claim:

1. In a corrosion resistant ferrous article comprising a ferrous base rendered corrosion resistant to both $SO_2$ and salt water-containing environments by a ductile, adherent, coating metallurgically bonded to a surface thereof, said coating having an alloy overlay and an intermetallic alloy layer intermediate said overlay and said ferrous base, the improvement wherein said overlay is an alloy from essentially within the quaternary Al-Zn-Si-Mg system having a metallurgical structure containing (1) cored aluminum-rich dendrites having dendrite arm spacings (DAS) of less than 10μ, (2) zinc-rich interdendritic regions, and (3) intermetallic phases of zinc, aluminum, magnesium and silicon; said alloy consisting essentially of, by weight, 3–20% magnesium and 3–15% silicon, balance aluminum and zinc, where the $$\frac{\text{(Al weight percent)}}{\text{(Zn weight percent)}}$$

is between 1 and 1.5.

2. The article according to claim 1, wherein said DAS are in the range of 3 to 9μ, and said intermetallic phases are selected from the group consisting of $Mg_2Si$, $MgZn_2$, intermetallic phases embedded with $SiO_2$, and $Mg_{32}(Al,Zn)_{49}$.

3. The article according to either of claims 1 and 2, wherein $$\frac{\text{(Al weight percent)}}{\text{(Zn weight percent)}}$$

is between 1.2 and 1.3, and that magnesium is present from 5% to 15% and silicon is present from 5% to 15%.

4. The article according to either of claims 1 and 2, wherein (Si weight percent)+[(Mg weight percent)/5] ≧ 10.

5. The article according to either of claims 1 and 2, wherein the silicon content of the alloy overlay is at least 5%, the magnesium content is at least 4%, and (Si weight percent)$^{0.6}$+(Mg weight percent)$^{0.6}$ ≧ 8.

6. The article according to either of claims 1 and 2, wherein (Si weight percent) ≧ 1.5+0.6(Mg weight percent).

7. The article according to either of claims 1 and 2, wherein the ferrous base is a low carbon steel.

8. The article according to either of claims 1 and 2, wherein the ferrous base is in the form of sheet.

9. The article according to either of claims 1 and 2, wherein the ferrous base is in the form of wire.

10. In a method for producing a metallic coating metallurgically bonded to a ferrous base, comprising the steps of (1) preparing a surface of said ferrous base for the reception of a metallic coating; (2) coating said surface with a molten alloy from essentially within the quarternary Al-Zn-Mg-Si system; and (3) cooling said coating to solidify the coating and form a ductile, adherent coating on said ferrous base, wherein said coating consists of an alloy overlay on a thin layer of an intermetallic alloy layer adjacent the ferrous base, the improvement wherein the molten alloy consists essentially of, by weight, magnesium from 3% to 20%, silicon from 3% to 15%, balance aluminum and zinc, where the $$\frac{\text{(Al weight percent)}}{\text{(Zn weight percent)}}$$

is between 1 and 1.5 thereby forming cored dendritic containing coating.

11. The method according to claim 10, wherein $$\frac{\text{(Al weight percent)}}{\text{(Zn weight percent)}}$$

is between 1.2 and 1.3, and magnesium is present from 5% to 15% and silicon is present from 5% to 15%.

12. The method according to either of claims 10 and 11, wherein (Si weight percent)+[(Mg weight percent)/5] ≧ 10.

13. The method according to claim 10, wherein the silicon content is at least 5%, the magnesium content is at least 4%, and (Si weight percent)$^{0.6}$+(Mg weight percent)$^{0.6}$ ≧ 8.

14. The method according to either of claims 10 and 11, wherein (Si weight percent) ≧ 1.5+0.6 (Mg weight percent).

15. The method according to either of claims 10 and 11, wherein said cooling is conducted during substantially the entire solidification range of said coating, at a rate of at least 20° F./second.

16. The method according to either of claims 10 and 11, wherein said ferrous base is a low carbon steel.

17. The method according to either of claims 10 and 11, wherein said ferrous base is in the form of sheet.

18. The method according to either of claims 10 and 11, wherein said ferrous base is in the form of wire.

* * * * *